United States Patent
Zunjarrao

(10) Patent No.: US 10,863,059 B2
(45) Date of Patent: Dec. 8, 2020

(54) ENVIRONMENTAL-BASED SPATIAL COLOR UNIFORMITY CORRECTION BY USING STATISTICAL DISTRIBUTION OF CAMERA MODULES

(71) Applicant: Microsoft Technology Licensing, LLC, Redmond, WA (US)

(72) Inventor: Vickrant Jaywant Zunjarrao, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 47 days.

(21) Appl. No.: 16/018,911

(22) Filed: Jun. 26, 2018

(65) Prior Publication Data
US 2019/0394360 A1 Dec. 26, 2019

(51) Int. Cl.
*H04N 5/217* (2011.01)
*G06T 5/50* (2006.01)
*H04N 5/235* (2006.01)
*H04N 5/243* (2006.01)

(52) U.S. Cl.
CPC .............. *H04N 5/217* (2013.01); *G06T 5/50* (2013.01); *H04N 5/2351* (2013.01); *H04N 5/243* (2013.01)

(58) Field of Classification Search
CPC ...... H04N 5/217; H04N 5/2351; H04N 5/243; G06T 5/50
See application file for complete search history.

(56) References Cited

U.S. PATENT DOCUMENTS 8,049,789 B2 11/2011 Innocent
8,531,542 B2 9/2013 Cote et al.
8,659,685 B2 2/2014 Smith et al.
9,080,916 B2 7/2015 Chang et al.
9,264,689 B2 2/2016 Li et al.
(Continued)

FOREIGN PATENT DOCUMENTS

WO 2012059618 A1 5/2012

OTHER PUBLICATIONS

"International Search Report and Written Opinion Issued in PCT Application No. PCT/US19/35154", dated Aug. 19, 2019, 11 Pages. (MS# 404662-WO-PCT).

*Primary Examiner* — Luong T Nguyen
(74) *Attorney, Agent, or Firm* — Ray Quinney & Nebeker P.C.; Paul N. Taylor

(57) ABSTRACT

A method of manufacturing an imaging system includes selecting a golden sample camera module, an upper sample camera module, and a lower sample camera module from a population of camera modules; measuring a golden sample non-uniformity profile at a plurality of CCTs for the golden sample camera module; measuring an upper sample non-uniformity profile at the plurality of CCTs for the upper sample camera module; measuring a lower sample non-uniformity profile at the plurality of CCTs for the lower sample camera module; calculating an anchor non-uniformity profile at each CCT for the population of camera modules by a weighted average of the golden sample non-uniformity profile, the upper sample non-uniformity profile, and the lower sample non-uniformity profile at each CCT; and storing a plurality of anchor non-uniformity profiles in a hardware storage device of the imaging system including a first camera module of the population of camera modules.

20 Claims, 6 Drawing Sheets

(56) References Cited

U.S. PATENT DOCUMENTS

| | | |
|---|---|---|
| 9,270,866 B2 | 2/2016 | Liu |
| 9,307,214 B1 | 4/2016 | Liu et al. |
| 9,307,215 B1 | 4/2016 | Liu et al. |
| 9,509,902 B1 | 11/2016 | Barron et al. |
| 9,532,024 B2 | 12/2016 | Guyomarc'h |
| 2006/0095222 A1 | 5/2006 | Reintjes et al. |
| 2013/0033585 A1* | 2/2013 | Li .................... H04N 13/15 348/51 |
| 2015/0036018 A1* | 2/2015 | Chen .................. H04N 9/735 348/223.1 |
| 2018/0225845 A1* | 8/2018 | Aarabi ............... G06T 11/001 |
| 2018/0349985 A1* | 12/2018 | Harris ................ G06Q 40/02 |

* cited by examiner

ENVIRONMENTAL-BASED SPATIAL COLOR UNIFORMITY CORRECTION BY USING STATISTICAL DISTRIBUTION OF CAMERA MODULES

BACKGROUND AND RELEVANT ART

Color filtered array (CFA) cameras contain an array of photoreceptors to detect photons that contact the array. The photoreceptors detect the presence of photons that are transmitted through a filter of various colors that is positioned in front of the photoreceptors. The filter allows greater transmission of one wavelength region relative to other wavelengths. The filters positioned over an array of pixels allow the concurrent capture of different color channels of the image.

The photoreceptor arrays typically have variations within the spatial distribution of the pixels of the array known as non-uniformity profiles. The variations in the array cause different responses to incident light at different areas of the array. For example, a photoreceptor array exposed uniformly to an illuminant will, theoretically, exhibit a uniform response to the uniform source at all portions of the array. Variations exist within manufacturing runs, producing camera modules with different responses.

The photoreceptor arrays may exhibit different non-uniformity profiles to different illuminants, as the photoreceptor arrays can have different responses to different wavelengths of incident light. For example, a photoreceptor array with a near uniform response to incandescent light can also exhibit non-uniform response to cooler illuminants, such as daylight.

BRIEF SUMMARY

In some embodiments, an imaging system for collecting an image includes a camera module, an image signal processor, and a hardware storage device. The camera module has at least one calibration non-uniformity profile associated with a calibration correlated color temperature (CCT). The image signal processor is in data communication with the camera module and the hardware storage device. The hardware storage device has stored thereon a plurality of anchor non-uniformity profiles, each associated with a CCT. At least one of the anchor non-uniformity profiles being associated with the calibration CCT.

In some embodiments, a method of processing a collected image includes receiving a collected image data from a camera module, the camera module having at least one calibration non-uniformity profile associated with the camera module at a calibration CCT, calculating an image CCT of the collected image data, determining a delta value between the at least one calibration non-uniformity profile and a first anchor non-uniformity profile of the calibration CCT, generating a local non-uniformity profile from the delta value and a second anchor non-uniformity profile associated with the image CCT, and applying the local non-uniformity profile to the collected image data to create a corrected image data.

In some embodiments, a method of manufacturing an imaging system includes selecting a golden sample camera module, an upper sample camera module, and a lower sample camera module from a population of camera modules; measuring a golden sample non-uniformity profile at a plurality of CCTs for the golden sample camera module; measuring an upper sample non-uniformity profile at the plurality of CCTs for the upper sample camera module; measuring a lower sample non-uniformity profile at the plurality of CCTs for the lower sample camera module; calculating an anchor non-uniformity profile at each CCT for the population of camera modules by a weighted average of the golden sample non-uniformity profile, the upper sample non-uniformity profile, and the lower sample non-uniformity profile at each CCT; and storing a plurality of anchor non-uniformity profiles in a hardware storage device of the imaging system including a first camera module of the population of camera modules.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 3-1 through FIG. 3-3 are schematic representations of a color filtered array, according to at least one embodiment of the present disclosure;

DETAILED DESCRIPTION

This disclosure generally relates to devices, systems, and methods for manufacturing and using an imaging system. More specifically, the present disclosure relates to manufacturing and using image signal processors and camera modules to faster, more precisely, and more efficiently correct spatial non-uniformity within a population of camera modules.

Conventional color imaging sensors utilize a plurality of color channels that detect light of a particular wavelength range. Each of the color channels may be discrete from one another with little to no overlap between the color channels. In some embodiments, neighboring color channels may exhibit a spectral sensitivity of no more than 20% of maximum sensitivity at a shared wavelength. For example, the red channel of a conventional red-green-blue ("RGB") imaging sensor may exhibit a spectral sensitivity of no more than 20% at any location in the neighboring green channel. The spectral sensitivity may be less than 10%, or ideally 0%, among shared wavelengths between channels. This discrete detection of colors of light in the individual color channels may aid in producing color mixed images that approximate human vision when the kernels of color pixels are interpolated by the imaging system.

Figure 1:
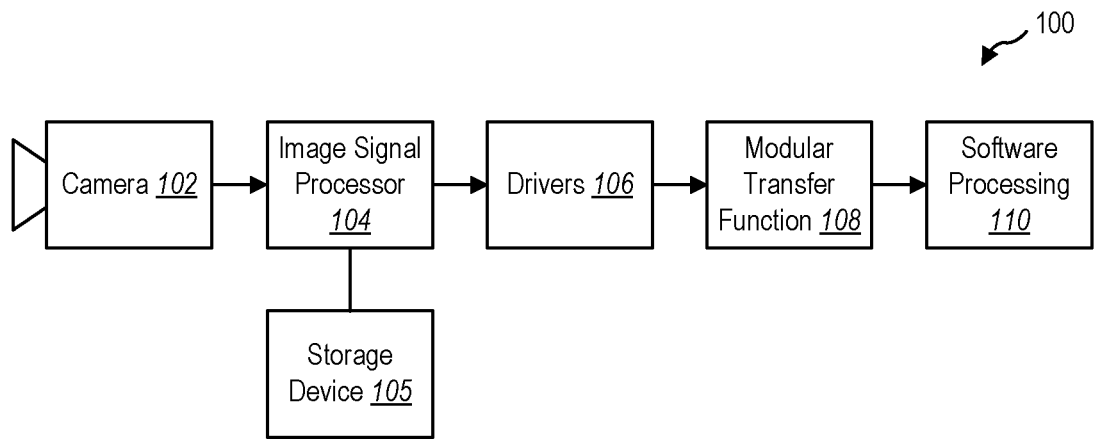
FIG. 1 is a schematic representation of an imaging system, according to at least one embodiment of the present disclosure.

Color imaging sensors may be utilized in a variety of electronic devices or machinery, such as wearable computing devices, automotive applications, industrial machinery, aerial devices (e.g., drones), or other devices that collect, record, or transmit visual information. For example, FIG. 1 is a schematic representation of an imaging system 100 used in digital cameras and video cameras; computing devices, such as laptops, tablets, hybrid computers, smartphones, and other computing devices; accessories for computing devices, such as webcams, head-mounted displays, motion capture systems, or other accessories; and other electronic devices.

In some embodiments, an imaging system 100 includes a camera module 102 that detects light and sends the detected brightness to an image signal processor (ISP) 104. The ISP 104 may be in data communication with a storage device 105. In some embodiments, the storage device 105 may be integral to the ISP 104. The storage device 105 may be a hardware storage device, such as a platen-based storage device, a solid-state storage device, or other non-transitory or long-term storage device. The storage device 105 may have instructions stored thereon to perform one or more methods or portions of a method described herein.

The ISP processes the image signal from the camera module 102, and the image data is further processed through device-specific drivers 106 and correction functions of a modular transfer function (MFT) 108 before being manipulated through applications or other software processing 110. The quality of the image data provided by the camera module 102 and ISP 104 is partially related to the spatial uniformity and/or response uniformity of the camera module 102. For example, variations in manufacturing imaging sensors or color filters in a population of camera modules 102 may produce inconsistencies in the spatial uniformity at a given correlated color temperature (CCT) (i.e., the proportions of ambient wavelengths), inconsistencies in a response to different CCTs, and inconsistencies in a response to different lux levels (i.e., amount of light at the given CCT).

While a spatial non-uniformity at a single CCT may be corrected through correction profiles at the ISP 104, differing spatial non-uniformities to various CCTs create an exponential need for calibration of individual camera modules 102 and ISPs 104. In a conventional imaging system, the ISP 104 may store a matrix of non-uniformity correction files (to correct spatial non-uniformity) for each combination of CCT and lux level. A typical camera may have correction profiles for a plurality of CCTs, such as D75, D65, D50, A, Horizon, CWF, TL84, U30, LED, Mixed lighting, or others. Each CCT may have correction files associated with a plurality of lux levels, including 0 Lux, 5 Lux, 10 Lux, 50 Lux, 200 Lux, 1000 Lux, 10000 Lux, or other levels. The creation and validation of the array of correction profiles for each camera module is time and resource intensive. An imaging system 100 according to the present disclosure may include a lesser number of anchor profiles created by a weighted average of at least three sample camera modules from a population. The ISP 104 may then adjust the anchor profiles and interpolate a correction profile for any camera module 102 of the population, saving time and resources, while providing a more precise non-uniformity correction.

Figure 2:
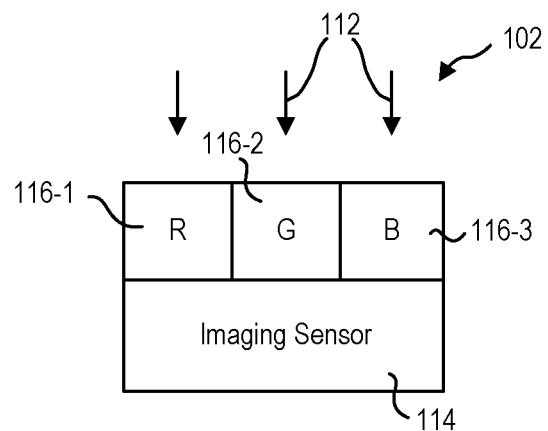
FIG. 2 is a schematic representation of a camera, according to at least one embodiment of the present disclosure.

FIG. 2 is a schematic side cross-sectional view of a conventional RGB camera module 102. The camera module 102 receives light 112 from the environment and detects the presence of the light 112 with an imaging sensor 114. In some embodiments, the light 112 may be ambient light, such as natural or solar light, or the light 112 may be artificial light such as electric lighting (e.g., halogen, fluorescent, incandescent, LED, or other electric lighting) in a building or outdoor space. The light 112 may have different emission spectra depending on the source. The imaging sensor 114 may exhibit different responses depending on the spectrum of the light 112.

The camera module 102 converts incident photons from the light 112 that reach the camera module 102 to an electrical signal. This electrical signal may be amplified and/or read out to create a mosaic image of discrete color channels that approximates human vision of the field of view (FOV) of the camera. The camera module 102 includes a plurality of filters 116-1, 116-2, 116-3 positioned proximate a surface of an imaging sensor 114 to control what portion of the spectrum of the light 112 reaches the imaging sensor 114.

In the depicted embodiment of a RGB camera module 102, the camera module 102 includes a red filter 116-1, a green filter 116-2, and a blue filter 116-3. In other embodiments with other color channel combinations, such as a CMYK, the filters may be related to the selected color combination. In some embodiments, the red filter 116-1 may allow transmission of only the red portion of the light 112, the green filter 116-2 may allow transmission of only the green portion of the light 112, and the blue filter 116-3 may allow transmission of only the blue portion of the light 112.

Figures 1, 2, 3:
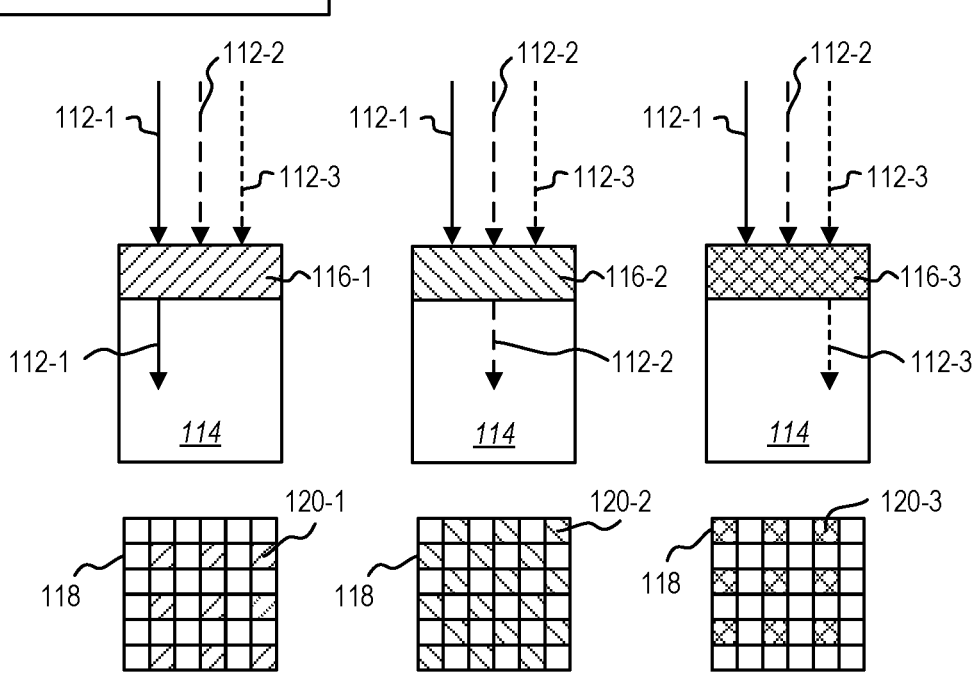

FIG. 3-1 through FIG. 3-3 illustrate the attenuation of portions of an incident white light by the color filters of the embodiment of a camera module 102 described in relation to FIG. 2. FIG. 3-1 illustrates an incident light approximated as including a red portion 112-1, a green portion 112-2, and a blue portion 112-3. The red filter 116-1 attenuates substantially all of the green portion 112-2 and the blue portion 112-3 while allowing the red portion 112-1 through to the imaging sensor 114. In some embodiments, the camera module 102 may include an array 118 of pixels. The pixels may each be a discrete color channel with the color filters at least partially determining the color channel of each pixel.

For example, the array 118 may include a conventional Bayer pattern with the red filter 116-1 positioned over the red pixels 120-1.

FIG. 3-2 illustrates the incident light of FIG. 3-1 approximated as including a red portion 112-1, a green portion 112-2, and a blue portion 112-3. The green filter 116-2 attenuates substantially all of the red portion 112-1 and the blue portion 112-3 while allowing the green portion 112-2 through to the imaging sensor 114. The array 118 may include a conventional RGB Bayer pattern with the green filter 116-2 positioned over the green pixels 120-2.

FIG. 3-3 illustrates the incident light of FIG. 3-1 approximated as including a red portion 112-1, a green portion 112-2, and a blue portion 112-3. The blue filter 116-3 attenuates substantially all of the red portion 112-1 and the green portion 112-2 while allowing the blue portion 112-3 through to the imaging sensor 114. The array 118 may include a conventional Bayer pattern with the blue filter 116-3 positioned over the blue pixels 120-3.

Figure 4:
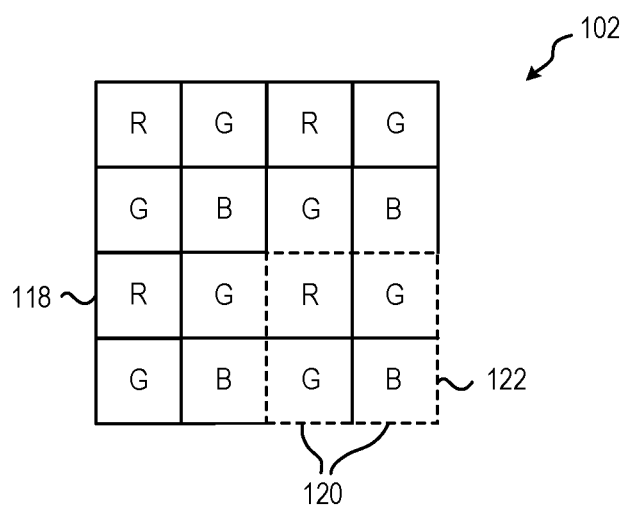
FIG. 4 is a schematic representation of domains with a color filtered array, according to at least one embodiment of the present disclosure.
Figure 5:
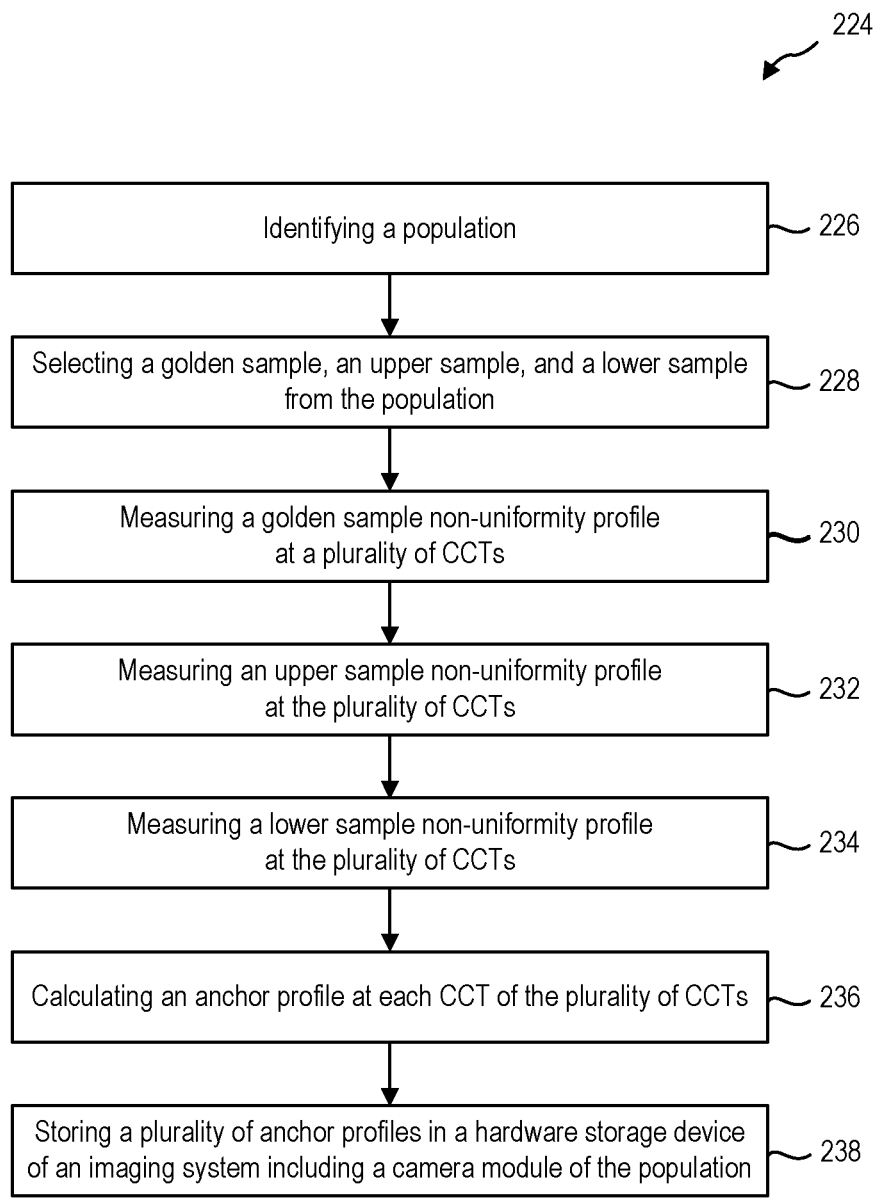
FIG. 5 is a flowchart illustrating a method of manufacturing a color filtered array camera, according to at least one embodiment of the present disclosure.

FIG. 4 illustrates an array 118 of pixels 120. The array 118 includes domains 122 of pixels 120. The camera module 102 can exhibit spatial non-uniformity between regions of the array 118, resulting in variations between the responses by different domains 122 or even by different pixels 120 within a domain 122. Because only pixels within a domain 122 are sensitive to a given wavelength of incident light, any single color channel (such as the red channel) does not include all pixel locations in the image data, and the image data is interpolated between the pixels 120 of a domain 122 to fill out the color channel information for each pixel location. This process can exacerbate any errors in the color detection or uniformity of the camera module 102.

In an embodiment according to the present disclosure, a method 224 of manufacturing imaging systems includes identifying a population of camera modules at 226 and selecting at least a golden sample module, an upper sample module, and a lower sample module of the population at 228. In some embodiments, the population may be identified upon manufacture. In other embodiments, the population may be identified upon receiving the population from a third-party manufacturer.

The population may be any number of camera modules. For example, a population of camera modules may be 10, 100, 1000, 10000, or more camera modules. In other examples, the population may be all camera modules manufactured in a factory in one day, two days, three days, one week, one month, or longer. In yet other examples, the population may be all camera modules manufactured in a production run. In further examples, the population may be all camera modules produced from a set of stock materials (such as a set of semiconductor wafers).

The method 224 includes measuring a golden sample non-uniformity profile of the golden sample at a plurality of CCTs at 230, measuring an upper sample non-uniformity profile of the upper sample at the plurality of CCTs at 232, measuring a lower sample non-uniformity profile of the lower sample at the plurality of CCTs at 234. For example, the golden sample of the population may be selected as the best performing sample of the population, and a series of non-uniformity profiles may be measured for different CCTs of the golden sample. The upper and lower samples may be less-uniform examples of camera modules from the population on a spectrum of spatial uniformity. In some embodiments, the upper and lower samples may be upper and lower limit samples for the population. For example, the upper limit sample and lower limit sample may represent the maximum deviation from the performance of the golden sample that meets the manufacturer and/or quality assurance requirements. In other embodiments, the upper and lower samples may represent deviations from the golden sample performance along a spectrum and may be above or below the upper limit and lower limit of performance.

In some embodiments, the method 224 further includes measuring a second lower sample non-uniformity profile and/or a second upper sample non-uniformity profile to further provide reference values below and above the golden sample non-uniformity profile, respectively.

The upper sample non-uniformity profile and the lower sample non-uniformity profile may, therefore, provide reference points along a spectrum of camera module performance above and below the golden sample non-uniformity profile. For example, the golden sample non-uniformity profile includes a golden sample response value for each pixel of the golden sample at a given CCT. The upper sample non-uniformity profile includes an upper sample response value (greater than the golden sample response value, at each corresponding pixel of the upper sample at the given CCT. The lower sample non-uniformity profile includes a lower sample response value (less than the golden sample response value), at each corresponding pixel of the lower sample at the given CCT.

The method 224 includes calculating an anchor profile at each CCT at 236 using a weighted average of the golden sample non-uniformity profile, the upper sample non-uniformity profile, and the lower sample non-uniformity profile. In some embodiments, the golden sample non-uniformity profile accounts for 65% of the anchor profile and the upper and lower sample non-uniformity profiles account for 17.5%, respectively. In other embodiments, the golden sample non-uniformity profile may account for a percentage of the anchor profile in a range having an upper value, a lower value, or upper and lower values including any of 50%, 55%, 60%, 65%, 70%, 75%, 80%, 85%, 90%, or any values therebetween. For example, the golden sample non-uniformity profile may account for more than 50% of the anchor profile. In other examples, the golden sample non-uniformity profile may account for less than 90% of the anchor profile. In yet other examples, the golden sample non-uniformity profile may account for between 50% and 90% of the anchor profile. In further examples, the golden sample non-uniformity profile may account for between 55% and 80% of the anchor profile. In at least one example, it may be critical that the golden sample non-uniformity profile may account for between 60% and 70% of the anchor profile.

In some embodiments, the upper sample non-uniformity profile may account for a percentage of the anchor profile in a range having an upper value, a lower value, or upper and lower values including any of 5%, 7.5%, 10%, 12.5%, 15%, 17.5%, 20%, 22.5%, 25%, or any values therebetween. For example, the upper sample non-uniformity profile may account for more than 5% of the anchor profile. In other examples, the upper sample non-uniformity profile may account for less than 25% of the anchor profile. In yet other examples, the upper sample non-uniformity profile may account for between 5% and 25% of the anchor profile. In further examples, the upper sample non-uniformity profile may account for between 10% and 22.5% of the anchor profile. In at least one example, it may be critical that the upper sample non-uniformity profile may account for between 15% and 20% of the anchor profile.

In some embodiments, the lower sample non-uniformity profile may account for a percentage of the anchor profile in a range having an upper value, a lower value, or upper and lower values including any of 5%, 7.5%, 10%, 12.5%, 15%, 17.5%, 20%, 22.5%, 25%, or any values therebetween. For example, the lower sample non-uniformity profile may account for more than 5% of the anchor profile. In other examples, the lower sample non-uniformity profile may account for less than 25% of the anchor profile. In yet other examples, the lower sample non-uniformity profile may account for between 5% and 25% of the anchor profile. In further examples, the lower sample non-uniformity profile may account for between 10% and 22.5% of the anchor profile. In at least one example, it may be critical that the lower sample non-uniformity profile may account for between 15% and 20% of the anchor profile.

In some embodiments, the upper sample non-uniformity profile is weighted more than the lower sample non-uniformity profile. For example, the upper sample non-uniformity profile may account for 20% of the anchor profile, while the lower sample non-uniformity profile may account for 15% of the anchor profile. In other embodiments, the upper sample non-uniformity profile is weighted less than the lower sample non-uniformity profile. For example, the upper sample non-uniformity profile may account for 15% of the anchor profile, while the lower sample non-uniformity profile may account for 20% of the anchor profile. In other embodiments, the upper sample non-uniformity profile is weighted equally than the lower sample non-uniformity profile. For example, the upper sample non-uniformity profile may account for 15% of the anchor profile, while the lower sample non-uniformity profile may account for 15% of the anchor profile.

In embodiments with a plurality of upper sample non-uniformity profiles and/or a plurality of lower sample non-uniformity profiles, the upper and lower sample non-uniformity profiles may be weighted equally as a sum of the upper sample non-uniformity profiles and as a sum of the lower sample non-uniformity profiles, or the upper and lower sample non-uniformity profiles may be weighted differently as a sum of the upper sample non-uniformity profiles and as a sum of the lower sample non-uniformity profiles. In some examples, the golden sample non-uniformity profile may be weighted as described herein, the upper sample non-uniformity profiles (collectively) may be weighted as described herein for the upper sample non-uniformity profile, and the lower sample non-uniformity profiles (collectively) may be weighted as described herein for the lower sample non-uniformity profile. In other words, the golden sample non-uniformity profile may account for 65% of the anchor profile, while a first upper sample non-uniformity profile may account for 10% and a second upper sample non-uniformity profile may account for 7.5%, and a first lower sample non-uniformity profile may account for 10% and a second lower sample non-uniformity profile may account for 7.5%.

The method 224 further includes storing a plurality of anchor profiles in a hardware storage device of an imaging system including a first camera module of the population at 238. The imaging system may then access the anchor profiles using an ISP or other processor to apply a local non-uniformity profile to image data collected by the first camera module.

The relative proportions used to calculate the anchor profiles may, in some embodiments, be related to the distribution of performance of the population of camera modules.

Figure 6:
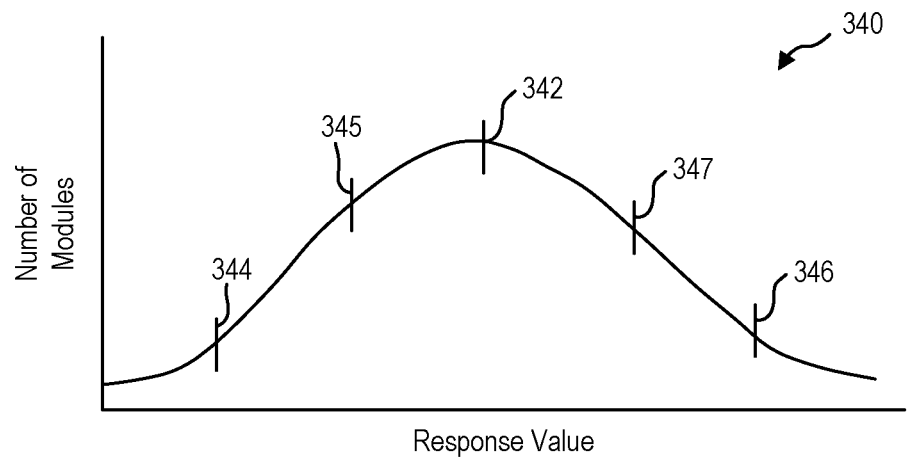
FIG. 6 is a graph illustrating an example population of camera modules, according to at least one embodiment of the present disclosure.

FIG. 6 is a graph 340 illustrating an example distribution of a population of camera modules relative to the uniformity of response values. Camera modules with performance most similar to a golden sample 342 may be in higher quantities near the center of the graph 340. The lower sample 344 and upper sample 346 may be selected from the remaining portion of the population below or above, respectively, the golden sample 342. In other examples, a second lower sample 345 and a second upper sample 347 (or any number of lower samples and/or upper samples) may be selected from the remaining portion of the population below or above, respectively, the golden sample 342.

Figure 7:
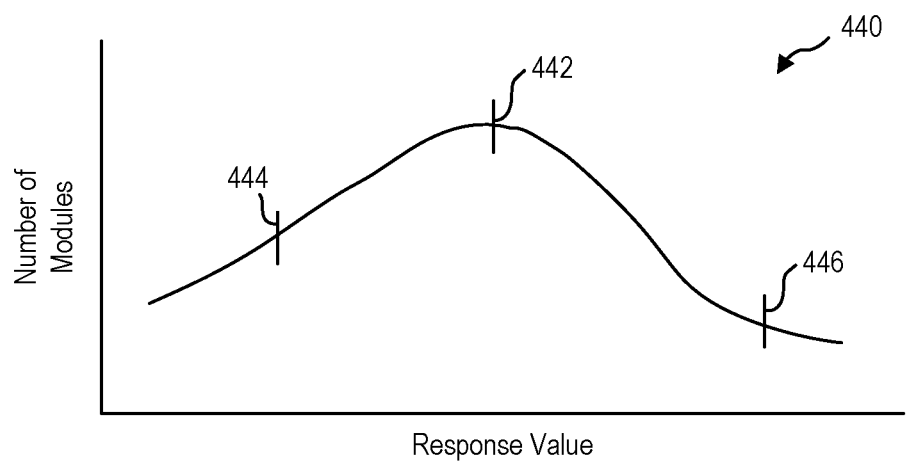
FIG. 7 is a graph illustrating another example population of camera modules, according to at least one embodiment of the present disclosure.

The graph 340 illustrates an approximately symmetrical distribution of performance among the population, and the non-uniformity profiles measured from the lower sample 344 and upper sample 346 may be weighted approximately equally in such populations. In other examples, the distribution may be asymmetrical, or the upper and lower samples may be selected from unequal portions of the distribution. FIG. 7 is a graph 440 that illustrates an example distribution of a second population. The golden sample 442 may exhibit the most accurate reproduction of images and may be weighted the highest, while the upper sample 446 and lower sample 444 may be weighted at lower and unequal amounts.

Figure 8:
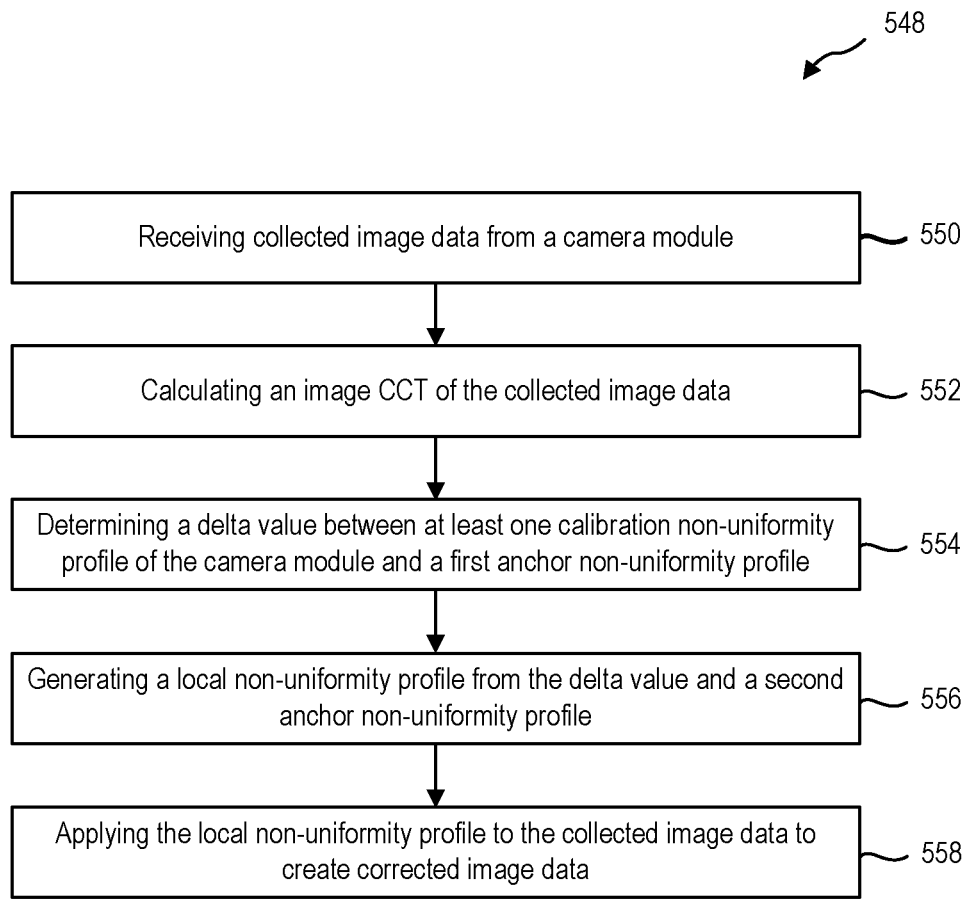
FIG. 8 is a flowchart illustrating a method of processing image data, according to at least one embodiment of the present disclosure.

FIG. 8 is a flow chart illustrating a method 548 of processing a collected image data, according to at least one embodiment of the present disclosure. The method 548 includes receiving collected image data from a camera module at 550. The camera module has at least one calibration non-uniformity profile associated with a calibration CCT. The camera module is calibrated upon manufacturing, and the calibration non-uniformity profile provides a correction profile for at least the calibration CCT.

The method 548 further includes calculating an image CCT of the collected image data at 552. For example, the collected image data may be processed by an auto white balance or other image processing technique to determine the predominant wavelengths of light present in the ambient environment during the image collection by the camera module.

The method 548 further includes determining a delta value between the calibration non-uniformity profile of the camera module and a first anchor non-uniformity profile that is associated with the calibration CCT at 554. For example, the calibration CCT may be D75, and the first anchor non-uniformity profile may be the anchor non-uniformity profile calculated for the population of camera modules to which the camera module belongs. The delta value may be the difference at each pixel and/or domain of the camera model between the calibration non-uniformity profile of the camera module at the calibration CCT and a first anchor non-uniformity profile at the calibration CCT.

In other embodiments, determining a delta value may include calculating a delta value at a plurality of calibration CCTs. For example, the camera module may be calibrated at two, three, four, or more different CCTs. Each of the calibration CCTs may correlate to a CCT of an anchor non-uniformity profile. The delta value may be determined by averaging or otherwise aggregating the differences between at least two of the calibration non-uniformity profiles and anchor non-uniformity profiles at the same calibration CCTs. For example, the first calibration CCT may be D75 and the second calibration CCT may be LED. The first delta value and the second delta value may be different, and an average of the first delta value and the second delta value produces an average delta value.

Once the CCT of the collected image data is calculated and the delta value (or average delta value) is determined, the method 548 includes generating a local non-uniformity profile for the image CCT of the collected image data at 556.

The local non-uniformity profile at the image CCT may be generated by applying the delta value (calculated from the calibration CCT) to the anchor non-uniformity profile that is associated with the image CCT.

Finally, the method 548 includes applying the local non-uniformity profile for the image CCT to the collected image data to create a corrected image data at 558. The corrected image data may then be stored or be used to display a corrected image to a user. For example, the corrected image data may be stored to a second hardware storage device, stored via a remote storage device (such as a cloud storage service), or other non-transient storage device. In other examples, a corrected image may be displayed to a user with a computer monitor, laptop display, tablet display, head-mounted display, or other display device.

Figure 9:
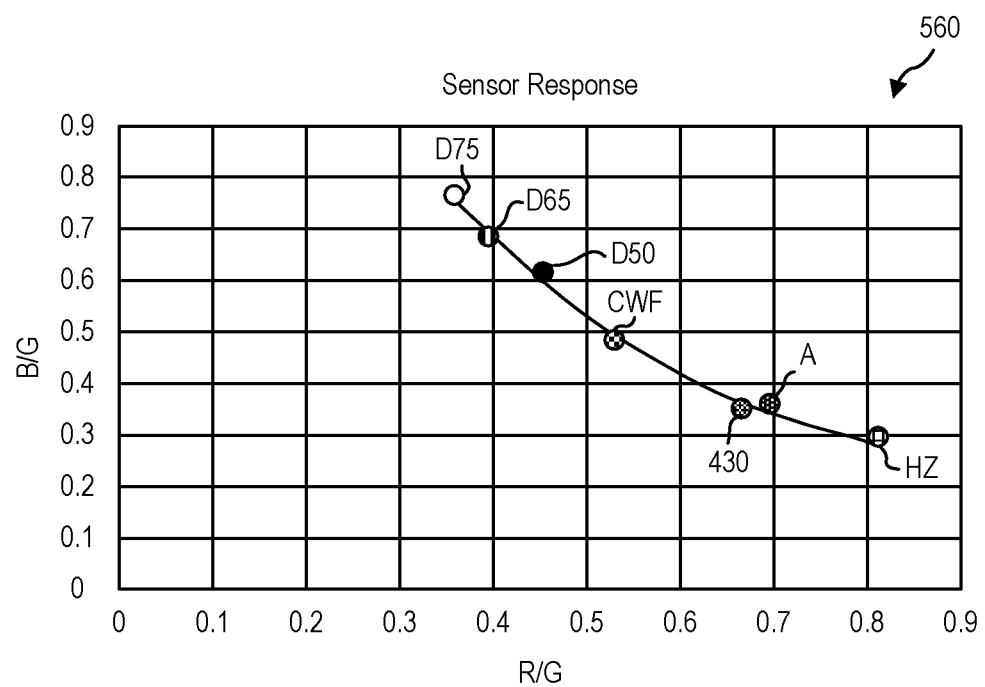
FIG. 9 is a chart illustrating an image correlated color temperature (CCT) relative to anchor CCTs, according to at least one embodiment of the present disclosure.

In some embodiments, the image CCT may calculated from the collected image data may be between a first anchor CCT and a second anchor CCT. FIG. 9 is a graph 560 illustrating example CCTs relative to the ratio of color channels based on color sensor response at that CCT. The CCTs are characterized by having different Kelvin temperatures. The Kelvin temperature values for each CCT relate to the "warmth" of the illuminant that creates that spectral distribution. For example, the Horizon CCT is characterized as a warm CCT with a Kelvin temperature of 2400K. The 75 CCT is characterized as a cool CCT with a Kelvin temperature of 7500K and is commonly used to approximate overcast outdoor lighting. The range of CCTs includes illuminants such as A (Tungsten) as a warm illuminant at 2856K and F2 or CWF (Cool White Fluorescent) as a cool illuminant at 4100K.

The collected image data may measure at a value between two of the CCTs for the anchor non-uniformity profiles. For example, the collected image data may include a combination of illuminant sources, such that an image CCT 562 does not perfectly align with a single CCT of the anchor non-uniformity profiles. Commonly encountered image CCTs may include a combination of A (incandescent lighting) and D65 (midday outdoor lighting from a window) illuminants or a combination of F2 or CWF (fluorescent lighting from car headlights) and Horizon (sunset lighting). In such embodiments, the image CCT 562 may be located along the curve of available anchor CCTs, as shown in FIG. 9.

In some embodiments, the local non-uniformity profile may be stored locally for future reference when a second image data is collected with a similar image CCT and/or stored remotely for cross-reference to other calculated local uniformity profiles of camera modules in the same population via a remote storage device, such as a cloud storage service. For example, the local non-uniformity profile may be compared with other calculated local uniformity profiles of camera modules in the same population to further refine the creation of local non-uniformity profiles of the camera module or other camera modules of the same population.

In some embodiments, an imaging system according to the present disclosure may calculate a local non-uniformity profile that is based on the image CCT 562 from a weighted combination of the anchor non-uniformity profiles at neighboring CCTs (e.g., CWF at 4100K and U30 at 3000K). For example, the image CCT 562 may be calculated at approximately 3275K. The local non-uniformity profile may, therefore, be generated by using 75% of a U30 anchor non-uniformity profile weighted with 25% of a CWF anchor non-uniformity profile, adjusted for the specific camera module of the population with the delta value measured for that camera module.

In at least one embodiment, creating a local non-uniformity profile from a plurality of anchor non-uniformity profiles may provide a more precise non-uniformity profile for uniformity correction of a camera module than a conventional matrix of non-uniformity profiles in less time and with less resources. In at least another embodiment, the use of anchor non-uniformity profiles for a population of camera modules may save time and resources in the production of imaging systems, while the dynamic creation of a local non-uniformity profile for a particular set of collected image data, may provide a more precise image correction than conventional methods.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. An imaging system for collecting an image, the imaging system comprising:
a camera module, the camera module having at least one calibration non-uniformity profile associated with a calibration correlated color temperature (CCT);
an image signal processor in data communication with the camera module; and
a hardware storage device in communication with the image signal processor and having stored thereon a plurality of anchor non-uniformity profiles, each anchor non-uniformity profile being associated with a CCT and at least one of the anchor non-uniformity profiles being associated with the calibration CCT, the hardware storage device having instruction stored thereon, that when executed by the image signal processor, cause the imaging system to:
receive a collected image from the camera module,
calculate an image CCT of the collected image, and
generate a local non-uniformity profile from a delta value between the at least one calibration non-uniformity profile and a first anchor non-uniformity profile of the calibration CCT and a second anchor non-uniformity profile associated with the image CCT, the delta value being a subtraction between the at least one calibration non-uniformity profile and the first anchor non-uniformity profile or the second anchor non-uniformity profile.

2. The imaging system of claim 1, the camera module having a first calibration non-uniformity profile at a first CCT and a second calibration non-uniformity profile at a second CCT.

3. The imaging system of claim 1, the plurality of anchor non-uniformity profiles being measured from at least three other camera modules.

4. The imaging system of claim 1, the hardware storage device being part of the image signal processor.

5. The imaging system of claim 1, the instructions further causing the imaging system to:
apply the local non-uniformity profile to the collected image to create a corrected image.

6. A method of processing a collected image, the method comprising:
receiving a collected image data from a camera module, the camera module having at least one calibration non-uniformity profile associated with the camera module at a calibration correlated color temperature (CCT);
calculating an image CCT of the collected image data;
determining a delta value between the at least one calibration non-uniformity profile and a first anchor non-uniformity profile of the calibration CCT by subtracting the at least one calibration non-uniformity profile and the first anchor non-uniformity profile of the calibration CCT;
generating a local non-uniformity profile from the delta value and a second anchor non-uniformity profile associated with the image CCT; and
applying the local non-uniformity profile to the collected image data to create a corrected image data.

7. The method of claim 6, further comprising displaying the corrected image data to a user.

8. The method of claim 6, the image CCT being between CCTs of two neighboring anchor non-uniformity profiles of the plurality of anchor non-uniformity profiles, the local non-uniformity profile being generated from a combination of the two neighboring anchor non-uniformity profiles.

9. The method of claim 8, the local non-uniformity profile being generated from a weighted combination of the two neighboring anchor non-uniformity profiles based on a color temperature difference of the image CCT and the CCTs of the two neighboring anchor non-uniformity profiles.

10. The method of claim 8, further comprising storing the local non-uniformity profile locally on a hardware storage device.

11. The method of claim 8, further comprising storing the local non-uniformity profile remotely and comparing the local non-uniformity profile against other local non-uniformity profiles created from a population used to create the first anchor non-uniformity profile.

12. The method of claim 8, calculating the image CCT including using an auto white balance operation.

13. A method of processing a collected image, the method comprising:
receiving a collected image data from a camera module, the camera module having at least one calibration non-uniformity profile associated with the camera module at a calibration correlated color temperature (CCT);
calculating an image CCT of the collected image data, the image CCT being between CCTs of two neighboring anchor non-uniformity profiles associated with the calibration CCT;
determining a delta value between the at least one calibration non-uniformity profile and a calculated anchor non-uniformity profile, the calculated anchor non-uniformity profile being located between the two neighboring anchor non-uniformity profiles and based on a color temperature difference between the two neighboring anchor non-uniformity profiles;
generating a local non-uniformity profile from the delta value and the calculated anchor non-uniformity profile;
applying the local non-uniformity profile to the collected image data to create a corrected image data; and
displaying the corrected image data to a user.

14. The method of claim 13, wherein the calculated anchor non-uniformity profile is determined from a weighted combination of the two neighboring anchor non-uniformity profiles.

15. The method of claim 13, further comprising storing the local non-uniformity profile locally on a hardware storage device.

16. The method of claim 13, further comprising storing the local non-uniformity profile remotely and comparing the local non-uniformity profile against other local non-uniformity profiles created from a population used to create the first anchor non-uniformity profile.

17. The method of claim 13, calculating the image CCT including using an auto white balance operation.

18. The method of claim 13, wherein calculating the delta value includes determining a difference at each pixel of the camera model between the calibration non-uniformity profile of the camera module at the calibration CCT and a first anchor non-uniformity profile at the calibration CCT.

19. The method of claim 13, wherein calculating the delta value includes determining a difference at each domain of the camera model between the calibration non-uniformity profile of the camera module at the calibration CCT and a first anchor non-uniformity profile at the calibration CCT.

20. The method of claim 13, wherein calculating the delta value includes calculating a plurality of delta values at a plurality of calibration CCTs and aggregating the calculated plurality of delta values into an average delta value.

* * * * *